Oct. 18, 1966    J. N. FISHER    3,279,791
SHEET MATERIAL FEEDING MECHANISM FOR A SHEAR LINE
Filed April 17, 1964    2 Sheets-Sheet 2
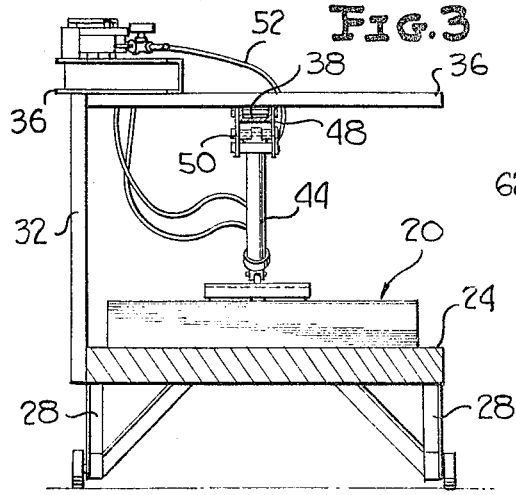
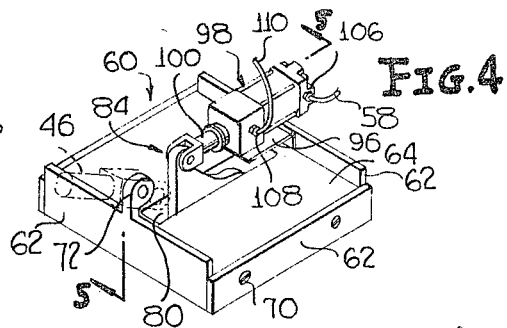
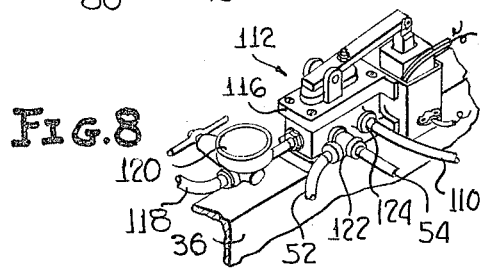
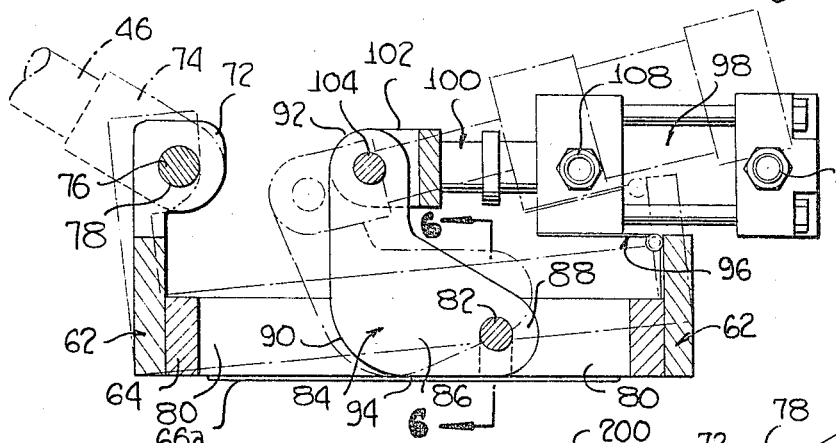
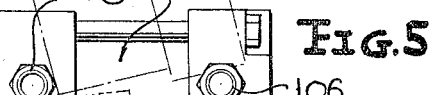
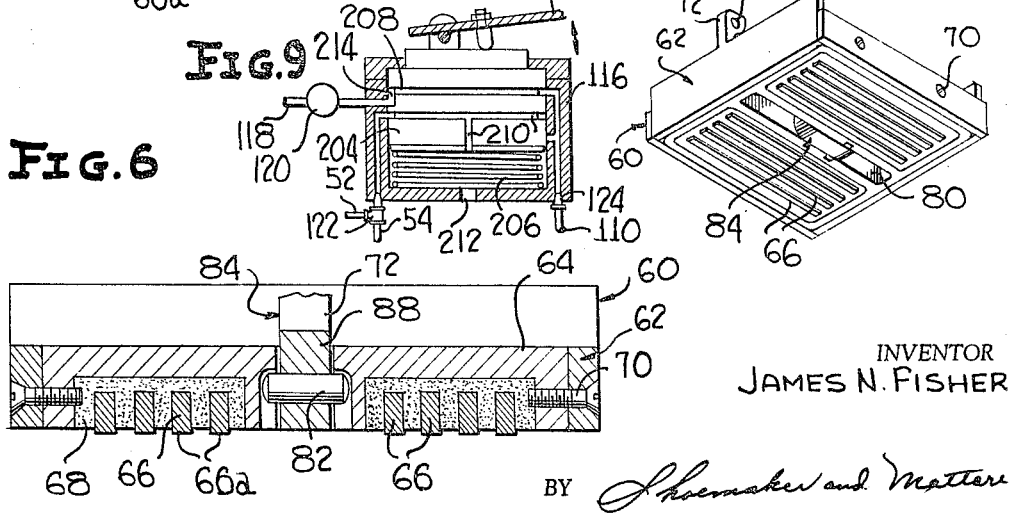
INVENTOR
JAMES N. FISHER
BY Shoemaker and Mattare
ATTORNEYS

United States Patent Office 3,279,791
Patented Oct. 18, 1966

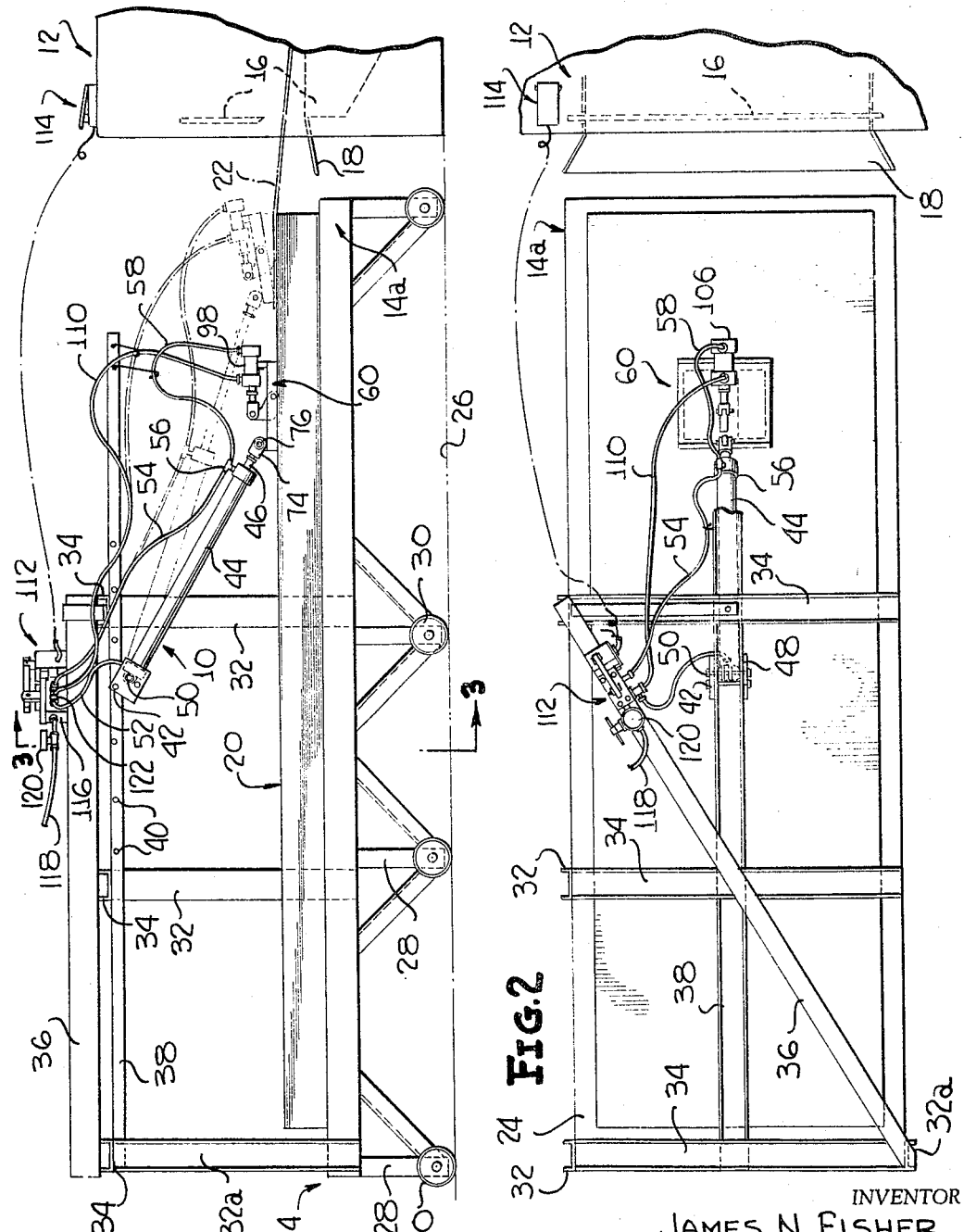

3,279,791
SHEET MATERIAL FEEDING MECHANISM FOR A SHEAR LINE
James N. Fisher, Hartwell, Ga., assignor to National Vulcanized Fibre Company, Hartwell, Ga., a corporation of Delaware
Filed Apr. 17, 1964, Ser. No. 360,644
16 Claims. (Cl. 271—42)

This invention relates generally to improvements in mechanism for handling sheet material.

A principal object of the present invention is to provide a mechanism by means of which sheet material may be picked up and fed to a shear or cutting machine.

More particularly the invention is directed to a machine or mechanism to feed sheets of any type of material, whether metal or non-metal, from a stack to a shear so that an operator needs to handle only the piece of material which is cut to size.

Another object of the invention is to provide a machine of the character stated, which is caster mounted whereby after being loaded with a supply or stack of sheets, it may be rolled into position at the shearing machine and subsequently rolled out of the way after completing a shearing operation and when no longer needed.

Still another object of the invention is to provide a sheet material feeding mechanism which is adapted for operation under manual control means or by automatic control in association with the shear machine, to feed sheet material a sheet at a time from a stack to the shear machine.

Still another object of the invention is to provide a sheet material feeding mechanism embodying a reciprocable unit which rests upon the top of the sheet to be fed into the shear machine and which will grip the sheet and move it forwardly to the shear machine and then release the sheet and retract either to again grip the sheet at another location and again move it forward or to engage the next sheet of the stack and advance it to the shear machine.

The invention broadly comprises a table or pallet, preferably caster mounted for easy movement or manipulation and having thereon a framework or superstructure preferably embodying uprights along one side and carrying a superstructure overlying the top of the pallet.

The superstructure has attached thereto, by suitable pivot means or a pivot connection, one end of a relatively long fluid cylinder and a piston therein connected with a piston rod extending from the opposite end of the cylinder. The cylinder and piston unit is designed, by reason of the pivotal mounting or connection of the cylinder with the superstructure, to be raised and lowered or to swing vertically as necessary.

The fluid cylinder and piston unit, which might be defined as a fluid motor, has the piston rod connected to a sheet gripper or paw which, in the form of the machine designed for handling steel sheets or other sheets which are subject to magnetic attraction, is in the form of a relatively large flat magnet. This magnet, preferably, is of the permanent type and is of sufficient strength to grip the desired metal sheet and lift it from a stack and also slide it or move it forwardly from the stack toward a shear machine and into a desired position relative to the shear, for cutting.

The magnet carries a fluid actuated thrust means whereby the magnet may be forced upwardly or levered upwardly away from the sheet when the sheet is to be released.

Pressurized operating fluid is conducted to and away from the fluid motor and the magnet carried fluid operated thrust means, under the control of an electromagnetically controlled valve or solenoid valve. Fluid lines leading from the valve to the fluid motor and to the magnet carried sheet releasing means, are arranged so that the releasing means remains inoperative when the magnet is in gripping relation with the sheet and the fluid motor is energized to thrust the magnet and attached sheet forwardly, and is made operative when the fluid motor is energized for reverse operation so that the sheet will be separated from the magnet and the reverse operation of the fluid motor will retract the magnet for repetition of the operating cycle of the machine.

The solenoid valve controlling the flow of operating fluid, when energized, causes the fluid motor to thrust the sheet gripping element forwardly and when deenergized, causes the fluid motor to retract and reversely move the sheet gripping member, when disengaged from the sheet, and thus the sheet gripping member can be controlled to either move all the way back or to move only part way back and then forwardly again so that a full forward shifting of the sheet can be effected, or the sheet can be shifted forwardly in short interrupted stages.

The invention will be best understood from a consideration of the following detailed description taken in connection with the accompanying drawings, wherein:

FIG. 1 is a view in side elevation of a sheet material feeding mechanism for a shear line, constructed in accordance with the present invention, showing the apparatus prepared for advancing a sheet and showing in broken lines the position of the parts at the end of a full stroke of the fluid motor with the sheet gripping magnet fulcrumed away from and thus detached from the sheet.

FIG. 2 is a view in top plan of the mechanism.

FIG. 3 is a vertical section taken substantially on the line 3—3 of FIG. 1.

FIG. 4 is a view in perspective of the sheet gripping magnet and the fluid operated motor thereon by which the release of the magnet from a sheet is effected.

FIG. 5 is a vertical section taken substantially on the line 5—5 of FIG. 4 and on an enlarged scale and showing in broken lines the position of the parts in releasing the magnet from a sheet.

FIG. 6 is a transverse section taken substantially on line 6—6 of FIG. 5.

FIG. 7 is a view in perspective of the magnet unit looking at the underside thereof.

FIG. 8 is a view in perspective of the electric solenoid valve.

FIG. 9 is a sectional detail of the electromagnetically actuated valve or solenoid valve of FIG. 8, modified in the positions of the air line connections.

Referring now more particularly to the drawings the numeral 10 generally designates the sheet material feeding mechanism of the present invention, which, when disposed for operation in a shear line, is located adjacent to shearing apparatus which is generally designated 12.

The mechanism 10 is mounted above a stack of the sheet material, such stack being supported in any suitable manner.

The preferred manner of supporting the stack of sheet material, in accordance with the present invention, consists of a pallet or table generally designated 14.

The pallet or table when in position for use is disposed adjacent to the shear apparatus to maintain the stack of sheet material at a convenient level or elevation so that the individual sheets may be moved from the stack beneath the shear which is designated 16.

For insuring the easy and unobstructed movement of a sheet from the stack to position beneath the shear knife, a forwardly and downwardly disposed guide apron 18 is associated with the shear mechanism or apparatus as illustrated.

Since the shear mechanism per se forms no part of the present invention, such mechanism is only diagrammatically illustrated.

The numeral 20 generally designates a stack of sheets of material to be fed to the shear apparatus 12, the numeral 22 designating a single or individual sheet, shown in broken lines as being extended from the stack to position beneath the knife of the shear.

The pallet or table in the preferred form or construction here shown and generally designated 14, comprises a top or platform 24 supported above the floor 26 at the desired elevation by braced legs 28.

To facilitate moving the table, suitable wheels or rollers 30 are pivotally attached to the legs 28. These rollers or wheels may be attached only to the legs supporting the forward and rear ends of the table or they may be attached to all of the legs if desired.

The pallet or table here illustrated has a platform 14 of substantial length and width to suitably support the sheet material and one end of the table, here designated 14a constitutes the front or forward end from which the sheets of material are moved by the feeding mechanism to the shear.

At one side of the table, here shown as the left side, a number of vertical posts 32 are secured to extend above the table top or platform. These posts 32 are spaced apart longitudinally of the platform but the forwardmost one of the group is located a substantial distance rearwardly of the forward end 14a of the platform as shown.

The posts 32 support a superstructure consisting of horizontal beams 34, each of which is secured to the top end of a post 32 and these beams extend across the table top or platform at a substantial elevation above the same.

The superstructure also includes a diagonal brace beam 36 extending across the tops of the horizontal beams 34 from the rear righthand corner of the structure to the top of the forwardmost horizontal beam 34 and the top end of the forwardmost post 32 as clearly shown in FIG. 2.

The righthand end of the rearmost beam 34 is also shown supported upon a vertical post 32a.

From the description thus far given it will be seen that the superstructure on the table top or platform is such as to provide an open space throughout the entire length of the table from the post 32a on the righthand side to the front end of the table and also the entire front portion of the table beyond the forwardmost post 34 is also clear and unobstructed on both sides or, that is, on the opposite side. It is to be understood, however, that while the illustration and description of the pallet or table as here given, shows the entire righthand side and forward end of the table unobstructed, with the exception of the single vertical rear end post 32a on the righthand side, this description and illustration is not intended to be limiting as to the disposition of the vertical posts 32 as it will be obvious that these posts may be placed on the righthand side so as to have the left side of the structure open. By providing one side of the structure completely unobstructed from the rear end posts 32 and 32a, a stack of sheets can be easily placed in position upon the table top or platform by a lift truck and with the forward end portion of the structure unobstructed on both sides, an attendant or operator can easily reach the hereinafter described sheet material feeding mechanism if and as required.

The numeral 38 designates a bar or beam extending longitudinally of the center of the table supporting superstructure, for supporting the hereinafter described fluid motor. This beam 38 is illustrated as being in the form of a channel iron and it extends across the undersides of the horizontal beams 34 and projects a substantial distance beyond the forwardmost beam 34 as shown in FIG. 1.

The sides or upstanding flanges of the channel beam 38 are each provided with a longitudinal row of bolt openings 40 for receiving pivot bolts 42 which provide transversely directed horizontal pivot means for the structure about to be described.

The feeding mechanism 10 includes as an element thereof, a relatively long piston enclosing fluid cylinder 44 which, together with the enclosed piston, not illustrated, and the piston rod or ram 46, forms a fluid motor or thrust means providing the power for moving a sheet of material when the latter is engaged and gripped by the hereinafter described gripping unit.

The cylinder 44 has a rear or upper end which is attached to the bar 38 by means of the pivot bolts 42, for vertical swinging movement. The attaching means here illustrated may be in the form of two hanger plates 48 having the bar 38 positioned therebetween and having the pivot bolts 42 extending therethrough as shown in FIG. 2 and FIG. 3. The upper end of the cylinder 44 is located between these plates, which are suspended in a vertical plane, and is pivotally joined or attached to the plates by pivot means 50 which may be in the form of a pivot pin paralleling the suspension bolts 42. However this pivotal support for the rear upper end of the cylinder 44 may be of any suitable character to permit the desired vertical swinging movement of the entire fluid motor which, as stated, consists of the piston cylinder and piston rod joined to a piston within the cylinder.

The numerals 52 and 54 designate upper and lower air lines or pipes for conducting air to and from the upper and lower ends respectively of the cylinder 44. The lower end of the pipe 54 is connected to the lower end of the cylinder 44 through a T coupling 56 and this coupling has connected thereto a pipe line 58 by which air is conducted to and from the hereinafter described piston cylinder which is provided for actuating the release means for the sheet gripping mechanism.

For the handling and feeding of metal sheets of ferrous or other meterial subject to magnetic attraction, there is provided a magnet unit, generally designated 60, for gripping the sheet and holding it while the sheet is thrust forwardly to the shear, and this unit also includes a means for effecting the release of the sheet by the magnet when the sheet has been extended forwardly from the stack to the desired extent.

The magnet 60 is illustrated as being of the permanent type and comprises a frame 62, which may be of either square or rectangular form, in which is fitted the inner frame 64 carrying a plurality of bar magnets 66. The bar magnets are secured in the inner frame in a suitable non-metallic body 68.

Any suitable means may be provided for securing the magnet carrying inner frame 64 within the outer frame 62 such, for example, as the screws 70.

As shown, the bar magnets 66 have under faces 66a arranged or positioned in a common plane whereby all of the magnet bars may rest flatly upon the surface of the metal sheet on the top of the stack to firmly attach the entire magnet unit to the sheet.

The rearward side of the outer frame 62 carries the upstanding ear 72 which lies in the longitudinal center of the magnet frame 64 and to this ear 72, the lower end of the piston rod 46 is attached by a clevis 74 and a pivot 76 passing through the clevis and through the aperture 78 of the ear.

The inner frame 64 of the magnet has an opening or slot 80 therein which extends in the longitudinal direction of the magnet structure and is at the longitudinal center thereof in alignment with the ear 72.

Disposed transversely of the slot 80 is a pivot pin 82, the ends of which are suitably mounted in the opposite walls of the slot and this pivot pin passes through the pivotally supports a ram or rocking thrust means which is generally designated 84. This ram comprises a plate 86 which is of only slightly less thickness than the width of the slot in which it is located and has the toe and heel portions 88 and 90 respectively and the leg portion 92 rising from the heel portion as illustrated in FIG. 5.

The toe portion of the ram is directed toward the forward side of the magnet or away from the piston rod 46 and has the pivot pin 82 extending therethrough as shown in FIGS. 5 and 6.

The leg 92 of the ram extends an appreciable distance above the top of the outer frame for the purpose hereinafter described.

The ram 84 has what might be described as an inoperative position and is shown in this position in FIG. 5 and as illustrated when it is in this inoperative position, the bottom edge 94 will lie in a plane slightly above the bottom edges 66a of the bar magnets.

At the forward or front side of the magnet unit a hinge bracket, generally designated 96, is secured to the outer frame 62 as shown in FIG. 5, and that hinge bracket has secured thereto and supports a fluid cylinder 98 for slight rocking motion on an axis extending transversely of the magnet frame and the cylinder 98 has projecting therefrom the fluid piston actuated rod 100 which is directed toward the leg 92 of the ram and carries a clevis 102 in which the ram leg is positioned and to which it is pivotally attached by the pivot pin 104.

The fluid conducting line 58 which extends from and is connected at one end to the T-coupling 56, is connected at its other end to the forward end of the piston cylinder 98, at 106.

The rearward end of cylinder 98 has connected thereto at 108, one end of a fluid line 110.

A piston, not shown, within the cylinder 98, and connected to the rod 100 is actuated by fluid alternately introduced into the ends of the cylinder to effect the extension of the piston rod 100, when the fluid is introduced at 106, and thereby rock the cam 84 to force the heel 90 down against the sheet and fulcrum the magnet up away from the sheet making the magnetic attraction between the sheet and magnet. Reversal of the fluid flow into the cylinder 98 through the connection 108 will, of course, return the cam to the position in which it is shown in full lines in FIG. 5.

Automatic actuation of the sheet feeding mechanism is effected by means of a switch controlled magnetic or electric solenoid valve which is generally designated 112.

The control switch for the valve 112 is designated 114.

The electromagnetic or solenoid valve may be of any standard make or design suitable for effecting the desired direction of operating fluid under pressure from a source first to one end of the cylinder 44 and the magnet controlling cylinder 98 and then to the other end of each of the cylinders whereby a sheet of material may be engaged and advanced to a desired extent and then released and the mechanism may then be returned to its starting position for repeating the operation.

The valve 112 is illustrated as having the body 116 supplied with operating fluid under pressure, from a source, through the line 118.

The numeral 120 designates a suitable pressure gauge for the compressed fluid supply line 118.

The numerals 122 and 124 designate fluid supply and exhaust fluid return ports which are controlled by the valve for directing the operating fluid to the tubes or pipe lines 52 and 110.

As illustrated, the fluid pipe lines 52 and 54 are connected to the valve port 122. The fluid pipe line 110 is connected to the valve port 124.

When the control switch is open the solenoid valve 112 will be de-energized and the fluid under pressure will be directed from the port 124 into the line 54 and by way of the T-coupling 56, into the lower end of the cylinder 44 and into the forward end of the cylinder 98. Thus, the sheet gripper unit 60 will be in the retracted position and the release cam 84 will be in the operative position in which the heel portion 90 is in contact with the underlying sheet.

Upon the closing of the switch 114 the solenoid valve will be energized to reverse the flow of fluid and in this case the fluid will then be directed from the port 122 into the upper end of the cylinder 44 to start the forward or advancing movement of the sheet gripper unit and at the same time the air or operating fluid will enter the rear of the gripper unit cylinder 98 and oscillate the cam 84 to the inoperative position in which it is illustrated in FIGS. 1 and 5.

It will accordingly be understood that in the full line position shown for the sheet gripping unit and piston rod 46 for the cylinder 44, in FIG. 1 the switch has been closed so that as the fluid pressure is introduced into the upper end of the cylinder 44 to advance the gripping unit, the fluid will also have entered the forward end of the gripping unit cylinder 98 to free the cam 84 from contact with the sheet so that the unit will be in gripping relation with the sheet upon which it rests, and the sheet will be moved forward as the ram or piston rod is forced outwardly from the cylinder and at the end of the advancing stroke where the sheet 22 is beneath the shear 16, the parts of the fluid motor 10 and of the sheet gripping unit will be in the positions illustrated in broken lines in this FIG. 1.

As described the gripping and advancing of the sheet occurs when the switch 114 is closed and when the switch is opened the sheet will be released and the apparatus will operate in reverse to come back to the starting position for engaging a second sheet. From this it will be apparent that a sheet may be extended or advanced to its full length if desired by holding the switch closed and also by having the motor or power unit 10 attached to the bar 38, at the proper location. By the provision of a number of openings or bolt holes 40 in the bar 38 adjustment of the power unit or motor 10 can be made for this purpose.

It will also be apparent that by repeatedly opening and closing the switch 114 at desired intervals, a sheet may be advanced only a short distance to be cut and then the gripping unit retracted a short distance and the sheet again gripped and advanced so that this action can be repeated as frequently as desired according to the number of cuts to be made.

While the control switch 114 has here been illustrated as being located upon an elevated part of the shear mechanism where it can be opened and closed by hand it will also be obvious that it can be located on the floor if desired to be foot operated.

Automatic operation of the sheet material feeding mechanism may also be obtained by installation of the control switch 114 on the shear stop, set at a desired cutting length. With such an arrangement, the sheet, when advanced, hitting the shear stop, will automatically return the mechanism for the next feed stroke.

For the feeding of sheets of non-ferrous material, or sheets having a non-ferrous content, such as copper, stainless steel, etc., a suction type gripping means may be substituted for the magnet. By mounting a small air cylinder on the cup, actuation of the suction pipe control valve may be effected to release the sheet.

From the foregoing it will be seen that there is provided by the present invention a relatively simple but highly efficient or effective mechanism for feeding sheet material from a stack so that an operator only has to handle the piece of material, cut to size, since, as hereinbefore stated, the stack of sheets may be lifted to be loaded onto the platform simply by raising the power unit or cylinder 10 and depositing the stack of sheets in position with a lift truck, as hereinbefore stated, the pallet or table is open on one side so that the sheets can be placed in position without difficulty.

While, of course, the table can be made to stand upon a supporting surface directly upon the supporting posts 28, by providing the posts with wheels or rollers as shown, the entire machine would be caster mounted so that it may be readily rolled into and out of position with respect to the shears.

In the sectional view forming FIG. 9, the connections 122 and 124 for the air lines 52 and 54 and for the air line 110 have had their positions changed for the convenience of showing all of the connections in one sectional view. As here illustrated, the solenoid actuated lever 200 depresses the valve piston 204 against the resistance of the spring 206. When the lever 200 is released by the solenoid, the piston valve 204 will return to the position shown where the actuating fluid will pass along the channel 208 into the line 110.

The lines 52 and 54 will then be mounted or exhausted by way of the channel 210 of the piston body 204 and the port 212. When the lever 200 is swung down by the solenoid, then the piston will be shifted downwardly and the channel or channels 210 will then be put in communication with the line 110 to exhaust the air from that line and the channel 208 will be shut off from the line 110 but will be put in communication with the lines 52 and 54 and with the supply line 18, as will be apparent, by movement of the fluid receiving pocket 214, formed in the piston body 204, downwardly.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. Mechanism for moving magnetic sheet material, comprising an elongate reciprocable power actuated element, means pivotally supporting one end of such element for vertical swinging of the other end thereof with respect to the surface of an underlying sheet of magnetic material to be moved, means operatively connected to said power element adapted to magnetically adhere to the said surface of and hold the sheet during longitudinal movement of the power element in one direction, and means carried by and movable relative to the sheet holding means for engaging and releasing the sheet from the said magnetic adhering means upon movement by and with the movement of the power actuated element in the opposite direction.

2. The invention according to claim 1, wherein operation of the last said means and the said movement of the actuating means in the opposite direction occur simultaneously.

3. Mechanism for feeding sheet material to a machine, said mechanism comprising an elongate reciprocable fluid actuated pusher element, means for supporting said element at one end above a sheet of material to extend downwardly toward the sheet, means attached to the other end of said element for coupling said other end of said element with an underlying sheet by gripping the surface of the sheet to effect movement of the sheet in its own plane upon extension of said pusher, and means for breaking the grip of said means for retraction of the latter and the pusher element, said grip breaking means being carried by the gripping means and being a fluid operated means.

4. The invention according to claim 3, wherein the said fluid actuated grip breaking means is constructed and arranged to apply thrust directly to the underlying sheet.

5. Mechanism for feeding sheet material to a machine, said mechanism comprising an elongate reciprocable fluid actuated pusher element, means for supporting said element at one end above a sheet of material to extend downwardly towards the sheet, magnetic means attached to the other end of said element for engaging the surface of an underlying sheet and gripping the sheet to effect movement of the sheet in its own plane upon extension of said pusher, and means for effecting breaking the grip of said magnetic means for retraction of the latter and the pusher element, the said last means being a rocking cam carried by the magnetic means and operating when rocked in one direction, to engage and apply thrust against the surface of the sheet, and fluid operated means for actuating said rocking cam.

6. Mechanism for feeding sheet material to a machine, said mechanism comprising a fluid motor embodying a piston cylinder and piston rod extending from one end thereof for reciprocation relative thereto, a fluid line connected to each end of said cylinder, means for suspending the cylinder from the other end thereof above sheet material to be fed to a machine, said one end of the piston cylinder extending downwardly, a sheet engaging unit pivotally attached to said piston rod and including means for effecting its adherence to the surface of a sheet, a fluid actuated means carried by said unit for breaking said adherence of said unit to a sheet, said fluid actuated means including a piston cylinder and piston rod and a movable thrust means coupled to the last mentioned piston rod for engagement with the surface of a sheet which said unit engages, a fluid conducting line connected to each end of the last mentioned cylinder, and valve means connected with said line for selectively conducting piston rod operating fluid from a source to said cylinders whereby said first piston rod may be projected while said sheet engaging unit is adhered to a sheet of material to feed the sheet to a machine and whereby said thrust means will be actuated to break such adherence and said first piston rod will be retracted to reversely move said unit free of adherence to a sheet.

7. The invention according to claim 6, wherein said movable thrust means comprises a rocking cam element.

8. The invention according to claim 6, wherein said means for effecting said adherence to a sheet is a magnetic means.

9. The invention according to claim 6, wherein said means for effecting said adherence to a sheet consists of a number of permanent magnets.

10. Mechanism for feeding sheet material to a machine, said mechanism comprising means for supporting a stack of sheets, a structure above said means and including a bar extending in the direction of feed of the sheets, a fluid cylinder pivotally attached at one end to said bar and extending downwardly and in the said direction of sheet feed, the cylinder having a fluid actuated piston rod extending from its other end, a substantially flat unit pivotally attached to said piston rod for swinging on an axis perpendicular to the rod, said unit being constructed to lie substantially flat upon a sheet, means forming a part of the unit by which the unit may be releasably secured to the surface of a supporting sheet, means for selectively directing an operating fluid from a source into the ends of said cylinder to project and retract the piston rod thereof, means movably supported on said unit for applying thrust against a sheet to which the unit is secured to effect release of the sheet from the unit, a second fluid cylinder having a fluid actuated piston rod therein, said second fluid cylinder being supported on said unit and having its piston rod operatively coupled to said thrust applying means, means for selectively directing an operating fluid from a source into the ends of said second cylinder to project and retract the piston rod thereof, and said means for selectively directing operating fluid to the ends of the two cylinders, from the fluid source, comprising a valve having one operating position in which fluid is introduced into one end of the first mentioned cylinder to effect advancement of the piston rod and the said unit while the unit is releasably secured to a sheet and while fluid is introduced into one end of the second cylinder to move the piston rod in the second cylinder in one direction to maintain said thrust applying means inoperative and the valve having another operating position in which the operating fluid is introduced into the other end of the first mentioned cylinder to effect retraction of the piston rod in the first mentioned cylinder together with retraction on said unit and fluid is also introduced into the other end of said second cylinder to move the piston rod of the latter in the opposite direction to effect movement of said thrust applying means against the said sheet to release the sheet from said unit.

11. The invention according to claim 10, wherein the said means for releasably securing the unit to a sheet is a permanent magnet and said thrust means comprises a cam element pivotally mounted on said unit and having a portion for movement into engagement with the surface of a sheet in which the unit rests and having a leg portion to which the piston rod of the second cylinder is coupled.

12. Mechanism for feeding sheet material to a machine, said mechanism comprising an elongate reciprocable fluid actuated pusher element, means for supporting said element at one end above a sheet of material to extend downwardly towards the sheet, magnetic means attached to the other end of said element for engaging the surface of an underlying sheet and gripping the sheet to effect movement of the sheet in its own plane upon extension of said pusher, and means for effecting breaking the grip of said magnetic means for retraction of the latter and the pusher element, said last means being a fluid actuated means carried by the magnetic means and operating by applying thrust against the sheet to effect the said breaking of said grip.

13. Mechanism for feeding sheet material to a machine, comprising an elongate pallet having a forward end, means for supporting the pallet on a floor and for facilitating its movement thereover relative to a machine to be fed, said pallet being adapted to support a stack of sheets of material, an upright support means on and at one side of said pallet, a superstructure carried by said support means and overlying and spaced above the pallet, an elongated bar carried by the superstructure above and extending longitudinally of the pallet, a fluid motor embodying a piston cylinder and piston rod extending from one end thereof for reciprocation relative thereto, a fluid line connected to each end of said cylinder, means pivotally connecting the other end of the cylinder to and suspending it from said beam to extend forwardly and downwardly therefrom toward the sheet material on the pallet to be fed to said machine, a sheet engaging unit pivotally attached to said piston rod and including means for effecting its adherence to the surface of an underlying sheet, a fluid actuated means carried by said unit for breaking said adherence of said unit to a sheet, said fluid actuated means including a piston cylinder and a piston rod and a movable thrust means coupled to the last mentioned piston rod for engagement with the surface of a sheet which said unit engages, a fluid conducting line connected to each end of the last mentioned cylinder, and valve means connected with said line for selectively conducting piston rod operating fluid from a source to said cylinders, whereby said first piston rod may be projected while said sheet engaging unit is adhered to a sheet of material to feed the sheet forwardly to a machine and whereby said thrust means will be actuated to break such adherence and said first piston rod will be retracted to reversely move said unit free of adherence to a sheet.

14. The invention according to claim 13, with means for moving the said pivotal connection of the first cylinder to the said beam, longitudinally of the beam for adjusting the working position of said unit relatively to the forward end of the pallet.

15. The invention according to claim 13, wherein said sheet engaging unit comprises a frame of polygonal contour and said means for effecting adherence of the unit to a sheet comprises magnets within the frame, said magnets being disposed to provide an open space within the frame, said magnets having lower faces lying in a common plane and adapted to lie flat upon a sheet when operatively adhered thereto, said thrust means being pivotally coupled to the unit and disposed in said open space, the thrust means when actuated thrusting down upon the underlying sheet and raising the unit frame on a bottom edge thereof located below the point of attachment between the unit and the first piston rod.

16. The invention according to claim 15, wherein said thrust means is substantially in the form of a bell-crank having a horizontal leg and a vertical leg forming an outer rounded heel, said round heel lying between the pivot coupling the thrust means with the unit frame and the said bottom edge of the frame, the said heel of the thrust means and said bottom edge of the frame supporting the unit on an underlying sheet upon reverse movement of the unit.

References Cited by the Examiner

UNITED STATES PATENTS

| 875,837 | 1/1908 | McIntyre | 271—43 |
| 1,298,685 | 4/1919 | Fischer | 271—43 |
| 1,706,533 | 3/1929 | Lorig et al. | 221—212 |
| 3,051,478 | 8/1962 | Rasmusson | 271—42 |
| 3,058,614 | 10/1962 | Marasso | 221—212 X |

M. HENSON WOOD, JR., *Primary Examiner.*

A. N. KNOWLES, *Assistant Examiner.*